United States Patent [19]

Endo et al.

[11] Patent Number: 5,724,381
[45] Date of Patent: Mar. 3, 1998

[54] RECEIVER FOR SPREAD SPECTRUM COMMUNICATION

[75] Inventors: Chisato Endo; Naoyuki Yamada; Tsutayuki Shibata, all of Aichi-ken; Masanori Miyashita, Nisshin; Yoshimi Kitazumi, Chiru, all of Japan

[73] Assignees: Kabushiki Kaisha Toyota Chuo Kenkyusho, Aichi-ken; Nippondenso Co., Ltd., Kariya, both of Japan

[21] Appl. No.: 531,341

[22] Filed: Sep. 20, 1995

[30] Foreign Application Priority Data

Sep. 22, 1994 [JP] Japan ............... 6-254391

[51] Int. Cl.$^6$ ............................................. H04K 1/00
[52] U.S. Cl. ................................. 375/206; 375/208
[58] Field of Search ............................ 375/200, 208, 375/206, 340, 343

[56] References Cited

U.S. PATENT DOCUMENTS

| | | | |
|---|---|---|---|
| 5,022,047 | 6/1991 | Dixon et al. | 375/200 |
| 5,243,622 | 9/1993 | Lux et al. | 375/200 |
| 5,396,515 | 3/1995 | Dixon et al. | 375/208 |

FOREIGN PATENT DOCUMENTS

| | | |
|---|---|---|
| 63-31127 | 6/1988 | Japan . |
| 6-284108 | 10/1994 | Japan . |
| 7-66750 | 3/1995 | Japan . |

*Primary Examiner*—Temgesghen Ghebretinsae
*Attorney, Agent, or Firm*—Oblon, Spivak, McClelland, Maier & Neustadt, P.C.

[57] ABSTRACT

A differential detector (2) reproduces a spreading code (S2) of a received signal (S1). A digital correlator (4) calculates a correlation value between the reproduced spreading code (S2) and a reference spreading code (S3) by collating bit by bit. The timing when the correlation value exceeds a predetermined threshold value (D2) means that the reproduced spreading code (S2) and the reference spreading code (S3) match in phase. A phase of the reproduced spreading code (S2), or a phase of the received signal (S1), is discriminated at that timing. A multiplier (8) outputs a modulated signal (S6) by multiplying the received signal (S1) bit by bit in phase by a spreading code (S5) which has the same code as the reference spreading code (S3). In result, a spreading code with an accurate code sequence and phase is obtained for despreading, and theoretical process-gain is obtained.

3 Claims, 4 Drawing Sheets

CORRELATION VALUE WITH ERROR-FREE REPRODUCED SPREADING CODE

CORRELATION VALUE WITH ERROR-CONTAINED REPRODUCED SPREADING CODE

RECEIVER FOR SPREAD SPECTRUM COMMUNICATION

BACKGROUND OF THE INVENTION

1. Field of the Invention

The present invention relates to a radio receiver of spread spectrum communication system installed in a portable radio data terminal and so forth.

2. Description of the Related Art

A conventional spread spectrum receiver is disclosed in the Japanese Patent with publication number of Sho 63-31127. The receiver executes despreading by multiplying a received spread spectrum signal by its delayed signal, producing a difference component signal of the two signals by a low-pass filter, reproducing a spreading code, and multiplying the spreading code by the received spread spectrum signal.

However, the conventional receiver cannot obtain a theoretical process gain, accurately. Since the despread is carried out based on the spreading code reproduced from the received spread spectrum signal, errors contained in the reproduced spreading code influence the result of the despread. More concretely, a mismatch between the original and the reproduced spreading codes likely occurs due to reproducing errors when the power ratio of the spread spectrum signal to noise is small or when there is interference of other signals in a spread band. Consequently, the despread based on the error contained spreading code cannot obtain the theoretical process gain and reproduce the spectrum of the original information signal, accurately.

SUMMARY OF THE INVENTION

It is, therefore, an object of the present invention to solve the above problems and to obtain a spreading code with accurate code sequence and phase for despreading at a spread spectrum receiver.

According to the first aspect of the invention, there is provided a spread spectrum receiver constituted by:

differential detection means for reproducing a spreading code from a received direct sequence spread spectrum signal;

digital correlation means for inputting the reproduced spreading code output from the differential detection means, calculating a correlation value between a predetermined reference spreading code and the reproduced spreading code by shifting bit by bit, and outputting a timing pulse when the correlation value exceeds a predetermined threshold value;

spreading code generation means for outputting a spreading code identical to the predetermined reference spreading code when the timing pulse is input from the digital correlation means;

first multiplication means for multiplying the received direct sequence spread spectrum signal by the spreading code output from the spreading code generation means in synchronization with each bit of the reference spreading code; and demodulation means for inputting an output signal from the multiplication means and demodulating a data.

According to the second aspect of the invention, the differential detection means is constituted by:

delay means for delaying the received direct sequence spread spectrum signal by a predetermined period; and second multiplication means for multiplying the received direct sequence spread spectrum signal by a delayed signal output from the delay means.

According to the third aspect of the invention, the digital correlation means is constituted by:

a shift register for shifting the reproduced spreading code;

storage means for holding the reference spreading code;

exclusive OR means for calculating value of exclusive OR of each bit of the shift register and the storage means;

addition means for adding values output from the exclusive OR means to obtain a correlation value;

comparison means for holding a threshold value and comparing the threshold value with the correlation value to output a first timing pulse; and delay means for outputting a second timing pulse in response to said first timing pulse to compensate for process time taken to find an acquisition point.

The differential detector multiplies a received spread spectrum signal by its delayed signal and reproduces a spreading code. Since the spreading code is predetermined between the transmitter and the receiver, the spreading code is stored in the receiver beforehand as a reference spreading code. The digital correlator calculates a correlation value by collating the reproduced spreading code by the differential detector and the reference spreading code bit by bit. The differential detector outputs the reproduced spreading code successively. A correlation value between the previous output and the reference spreading code is calculated. Consequently, the correlation value is calculated at every time when a new bit of reproduced spreading code is output by the differential detector.

A maximal-length sequence (M-sequence) with the length of $2^n-1$ is used as the spreading code for direct sequence spread spectrum. The correlation value between the reproduced spreading code and the reference spreading code becomes maximum $2^n-1$ when those sequences are in phase and becomes minimum $-1$ when they are out of phase. However, when the reproduced spreading code contains some errors, the correlation value of the reproduced spreading code and the reference spreading code results in an intermediate value between the maximal and minimal values. Accordingly, the timing when the obtained correlation value exceeds a predetermined threshold value means that the reproduced spreading code synchronizes with the reference spreading code. Consequently, a phase of the reproduced spreading code, or a phase of the spreading code superposed on the received spread spectrum signal, can be discriminated at that timing.

Both the received spread spectrum signal and the reference spreading code output by the spreading code generator are input into the multiplier. The spreading code generator detects the phase of the spreading code superposed on the received spread spectrum signal and outputs the reference spreading code in synchronization with the spreading code superposed on the received spread spectrum signal, continuously.

A modulated signal is obtained from the multiplier which despreads by multiplying the received spread spectrum signal and the generated spreading code bit by bit. Then, demodulation is carried out according to the modulation method at the transmitter.

The spreading code for despreading is identical to that used at the transmitter, so that the reproduced spreading code detected from the received signal is only used for determining the phase of the spreading code. Consequently, a theoretical process gain can be obtained, accurately.

Further, utilizing the digital correlator enables to shorten required time for discriminating the timing, or the acquisition point.

Further, most components of the receiver can be constituted by digital logic devices, so that the receiver requires no adjustment and can be integrated.

Other objects, features, and characteristics of the present invention will become apparent upon consideration of the following description in the appended claims with reference to the accompanying drawings, all of which form a part of the specification, and wherein referenced numerals designate corresponding parts in the various figures.

DETAILED DESCRIPTION OF THE PREFERRED EMBODIMENT

The invention will be more fully understood by reference to the following embodiment.

Figure 1:
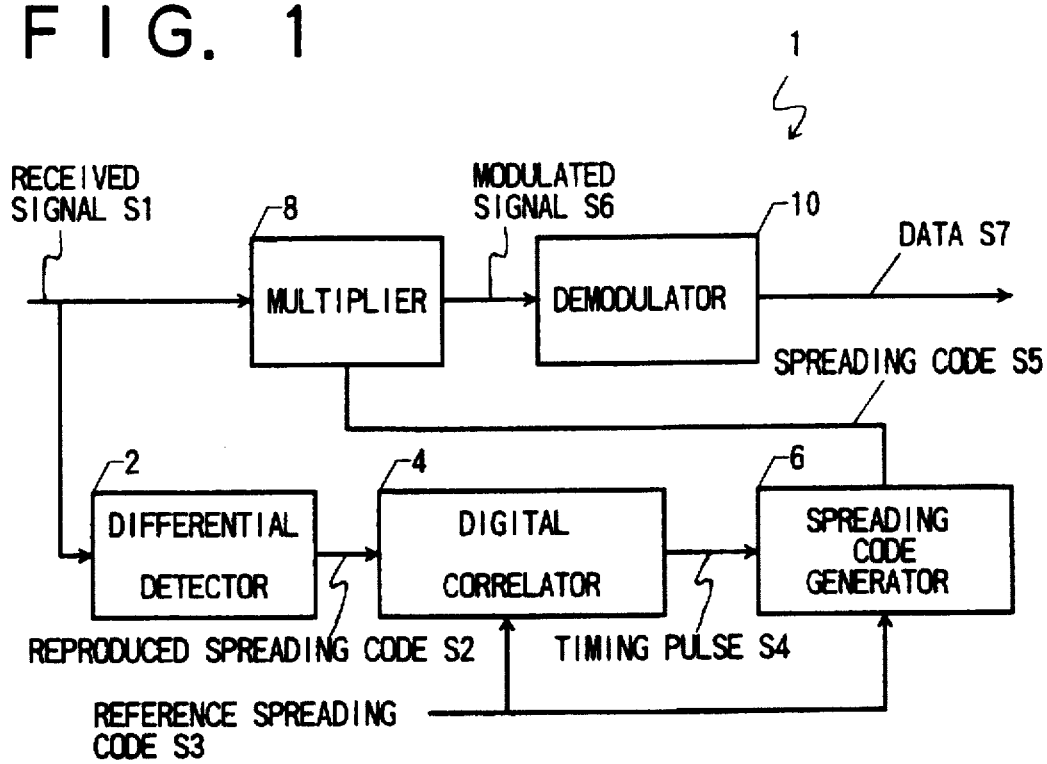
FIG. 1 is a diagram showing the whole structure of the receiver for spread spectrum communication according to the present invention.

FIG. 1 shows the whole structure of a receiver 1 for spread spectrum communication, which has a differential detector 2, a digital correlator 4, a spreading code generator 6, a multiplier 8, and a demodulator 10. The differential detector 2 reproduces a spreading code S2 from a received signal S1 spread by a direct sequence spread spectrum method. The digital correlator 4 calculates a correlation value between the reproduced spreading code S2 and a reference spreading code S3 which is the same code that used when the received signal S1 is transmitted. The spreading code generator 6 generates a spreading code S5 synchronizing with a timing pulse S4 output by the digital correlator 4. The multiplier 8 multiplies the received signal S1 by the spreading code S5. The demodulator 10 demodulates a modulated signal S6 output from the multiplier 8 and obtains a data S7.

Figure 2:
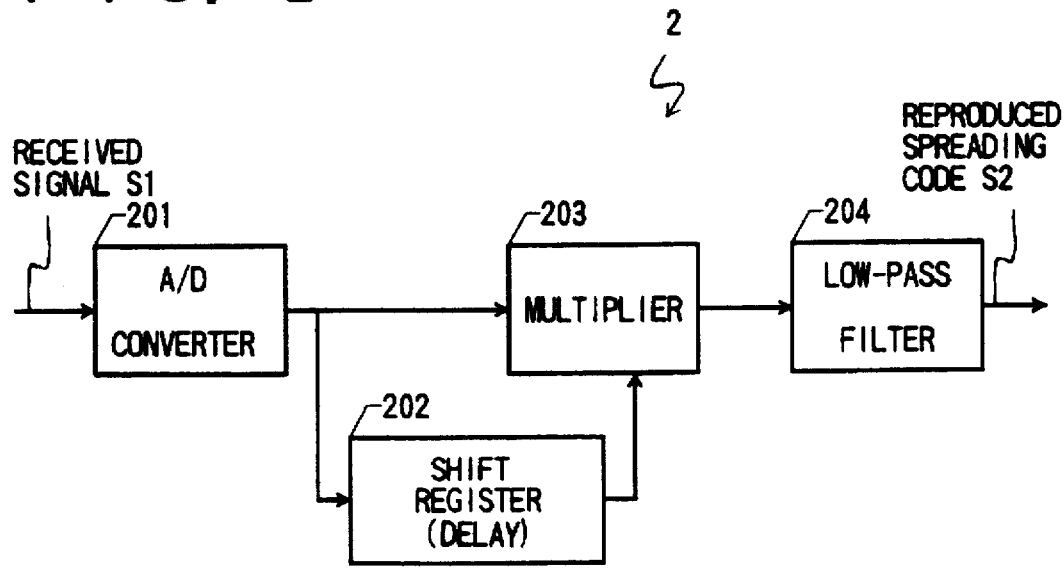
FIG. 2 is a diagram showing the structure of differential detector for reproducing a spreading code according to the present invention.

The performance of the receiver 1 is explained hereinafter. A pseudo-noise sequence of maximal-length sequence with the length of $2^n-1$ is used as a spreading code for direct sequence spread spectrum method in this embodiment. The modulated signal which is a carrier wave modulated by a data to be transmitted is spread by the spreading code. The received signal S1 is input into the differential detector 2 whose constitution is shown in FIG. 2. The received signal S1 which is an analog signal is converted into a digital one by an A/D converter 201 and then, is delayed by a shift register 202 by a predetermined period. A multiplier 203 multiplies the output signal from the A/D converter 201, i.e., non-delayed signal, by the output signal from the shift register 202, i.e., signal delayed by the predetermined period. Then, the output signal from the multiplier 203 is input into a low-pass filter 204, and the spreading code S2 is reproduced.

Figure 3:
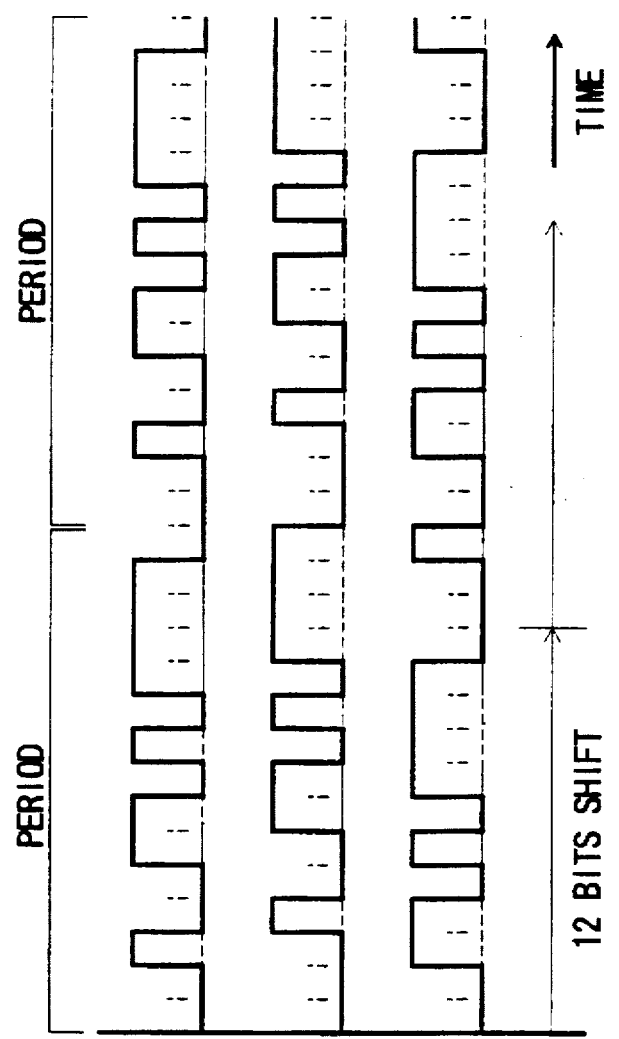
FIG. 3 is a wave form of the spreading code reproduced by the difference detector according to the present invention.

Since an M-sequence which has "Cycle and Add" property is used as the spreading code in this embodiment, the above-described process enables to reproduce the original spreading code shifted by certain bits. When the M-sequence with the length of $2^4-1$ is used as the spreading code, the phase of the reproduced spreading code S2 is shifted by 12 bits behind the phase of the spreading code contained in the received signal S1 as shown in FIG. 3.

Figure 4:
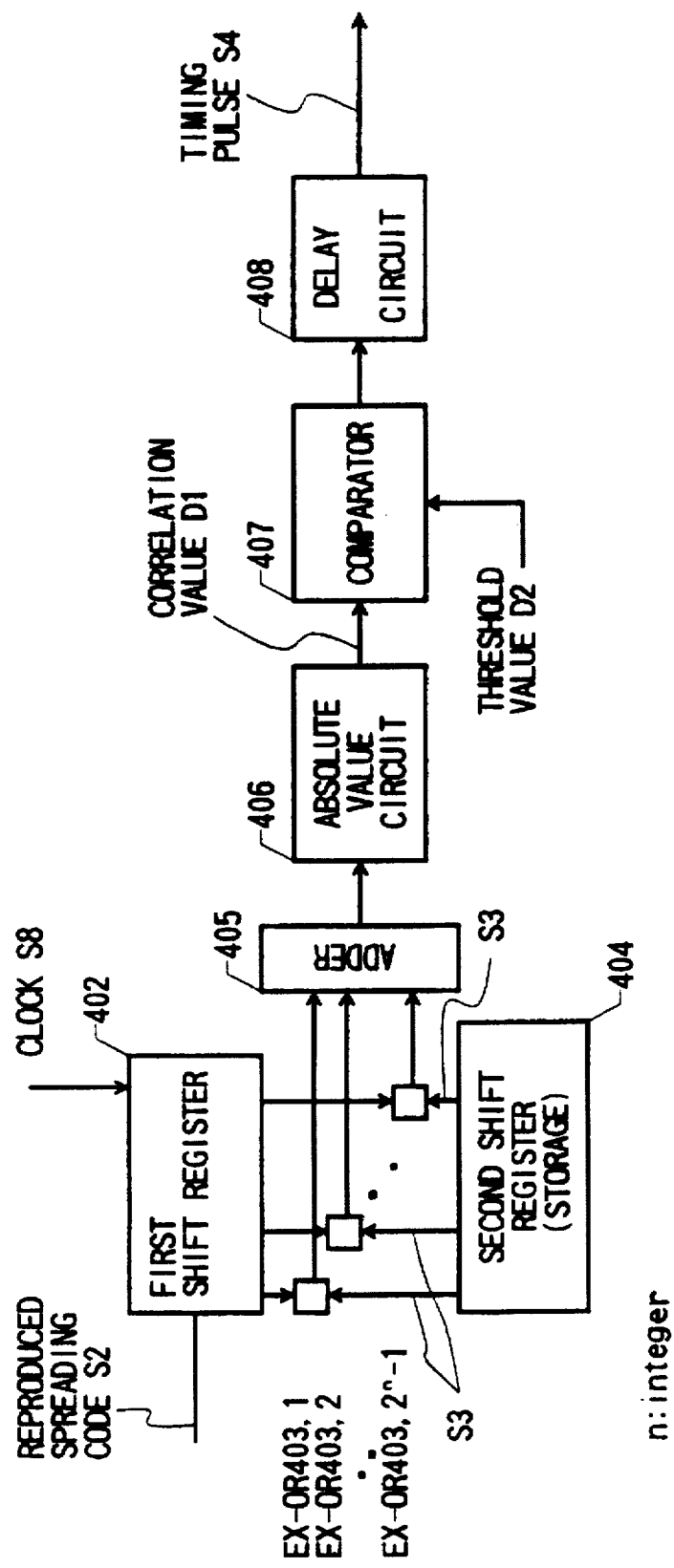
FIG. 4 is a diagram showing the structure of a digital correlator for generating timing pulse for generating the spreading code according to the present invention.

The reproduced spreading code S2 is input into the digital correlator 4 whose detail structure is shown in FIG. 4. The reproduced spreading code S2 is input into the first shift register 402 bit by bit synchronizing with a clock S8 whose frequency is as same as spreading code's rate 1/Tc. The reference spreading code S3 is loaded in the second shift register 404 beforehand. Each EX-OR 403.k (k=1, . . . , $2^n-1$) calculates the value of exclusive OR of outputs from the shift registers 402 and 404. Each of the obtained values of the EX-ORs is input into and added in an adder 405. An absolute value circuit 406 calculates an absolute value of the added value obtained by the adder 405. The output value from the absolute value circuit 406 is a correlation value D1 which shows degree of correlation between the reproduced spreading code S2 and the reference spreading code S3.

In this embodiment, the maximum of correlation value D1 is $2^n-1$. The collation of the reproduced spreading code S2 with the reference spreading code S3 is carried out bit by bit synchronizing with the clock S8. The point when the correlation value D1 takes maximum means the point when synchronization between the reference spreading code S3 and the reproduced spreading code S2 is established. This is described as the acquisition point hereinafter.

On condition that the power ratio of the received signal S1 to noise is small and/or that there are some signals which interfere with the received signal S1, the reproduced spreading code S2 contains errors and does not accord with the original spreading code used at the transmitter. In result, the maximum of the correlation value D1 obtained under such conditions becomes smaller than $2^n-1$. In order to detect the acquisition point even in that case, a threshold value D2 which is smaller than $2^n-1$ is set in advance. A comparator 407 compares the threshold value D2 with the correlation value D1. A point when the correlation value D1 exceeds the threshold value D2 is hereafter regarded as the acquisition point. A timing signal output from the comparator 407 is delayed for a predetermined period by a delay circuit 408 which compensates for processing time taken for finding the acquisition point, and the timing pulse S4 output from the delay circuit 408 is input into the spreading code generator 6.

Figure 5A:
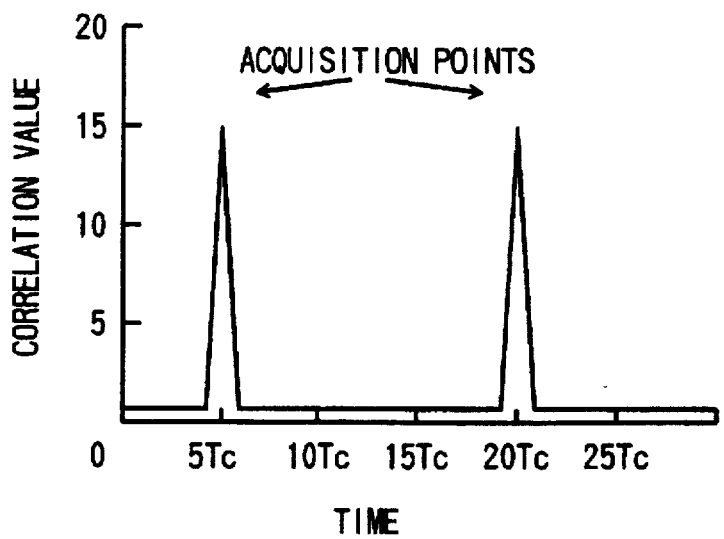
FIGS. 5A and 5B are characteristic figures each showing a correlation value obtained by the digital correlator.
Figure 5B:
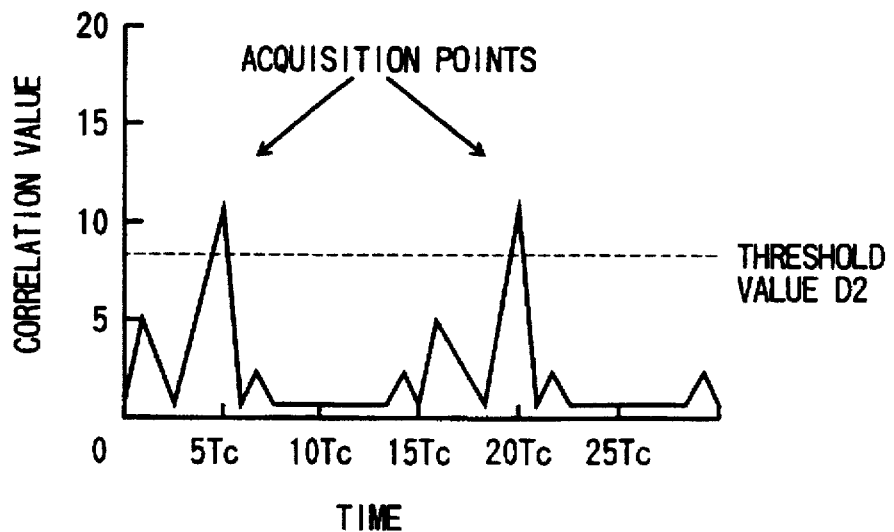

FIGS. 5A and 5B contrast changes of the correlation values depending on whether the reproduced spreading code of an M-sequence with the length of $2^4-1$ contains errors or not. FIG. 5A shows the correlation value of an error-free reproduced spreading code and FIG. 5B shows that of error-contained reproduced spreading code. It is found that maximal correlation values decrease from 15 to 11 and other correlation values increase from 1 to 5 when errors are contained in the reproduced spreading code. Accordingly, setting the threshold value D2 at a value smaller than the maximal correlation value and larger than the other correlation values enables to detect the acquisition point correctly even when errors are contained in the reproduced spreading code S2.

The timing pulse S4 is input into the spreading code generator 6. When the timing pulse S4 is input, the spreading code generator 6 begins to generate a spreading code S5 which is identical to the reference spreading code S3. The multiplier 8 multiplies the received signal S1 by the spreading code S5, so that the modulated signal S6, i.e., carrier wave modulated by a data, is despread. Then, the modulated signal S6 is demodulated depending on its modulation method by the demodulator 10 and a data S7 is obtained.

Since it is possible to constitute most parts of the circuit shown in FIG. 1 by digital logic devices, the circuit becomes adjustment-free logic and is downsized by integration. Further, even though errors are contained in the reproduced spreading code by fading caused in mobile communication, the receiver of the present invention can correctly despread. Therefore, the present invention is suitable for a spread spectrum radio receiver installed in a portable data terminal.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A spread spectrum receiver for despreading a direct sequence spread spectrum signal comprising:

differential detection means for reproducing a spreading code from a received direct sequence spread spectrum signal;

digital correlation means for inputting said reproduced spreading code output from said differential detection means, calculating a correlation value between a predetermined reference spreading code and said reproduced spreading code by shifting bit by bit, and outputting a timing pulse when said correlation value exceeds a predetermined threshold value;

spreading code generation means for outputting a spreading code identical to said predetermined reference spreading code when said timing pulse is input from said digital correlation means;

first multiplication means for multiplying said received direct sequence spread spectrum signal by said spreading code output from said spreading code generation means in synchronization with each bit of said reference spreading code; and demodulation means for inputting an output signal from said first multiplication means and demodulating a data.

2. A spread spectrum receiver according to claim 1, wherein said differential detection means comprises:

delay means for delaying said received direct sequence spread spectrum signal by a predetermined period; and second multiplication means for multiplying said received direct sequence spread spectrum signal by a delayed signal output from said delay means.

3. A spread spectrum receiver according to claim 1, wherein said digital correlation means comprises:

shift register for shifting said reproduced spreading code;

storage means for holding said reference spreading code;

exclusive OR means for calculating value of exclusive OR of each bit of said shift register and said storage means;

addition means for adding values output from said exclusive OR means to obtain said correlation value;

comparison means for holding a threshold value and comparing said threshold value with said correlation value to output a first timing pulse; and delay means for outputting a second timing pulse in response to said first timing pulse to compensate for process time taken to find an acquisition point.

* * * * *